Figure 9:
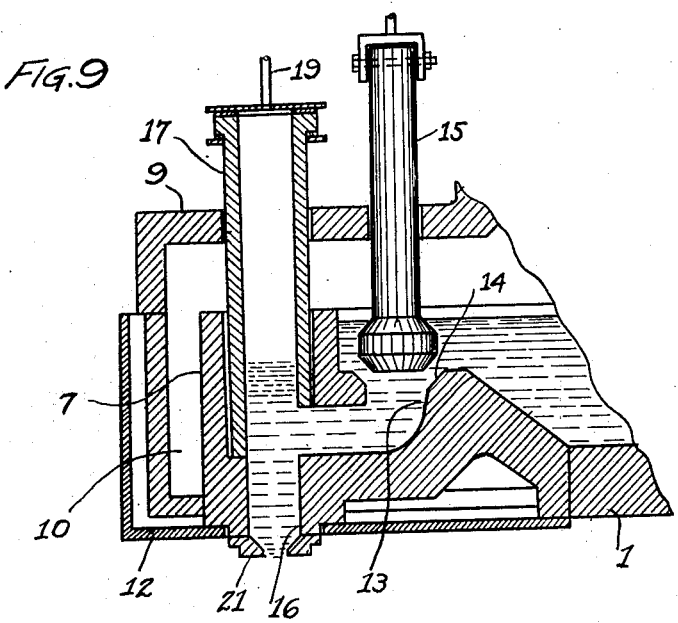

Sept. 8, 1936.  G. R. HAUB  2,053,663
GLASS FEEDING APPARATUS
Filed Feb. 25, 1932  4 Sheets-Sheet 1
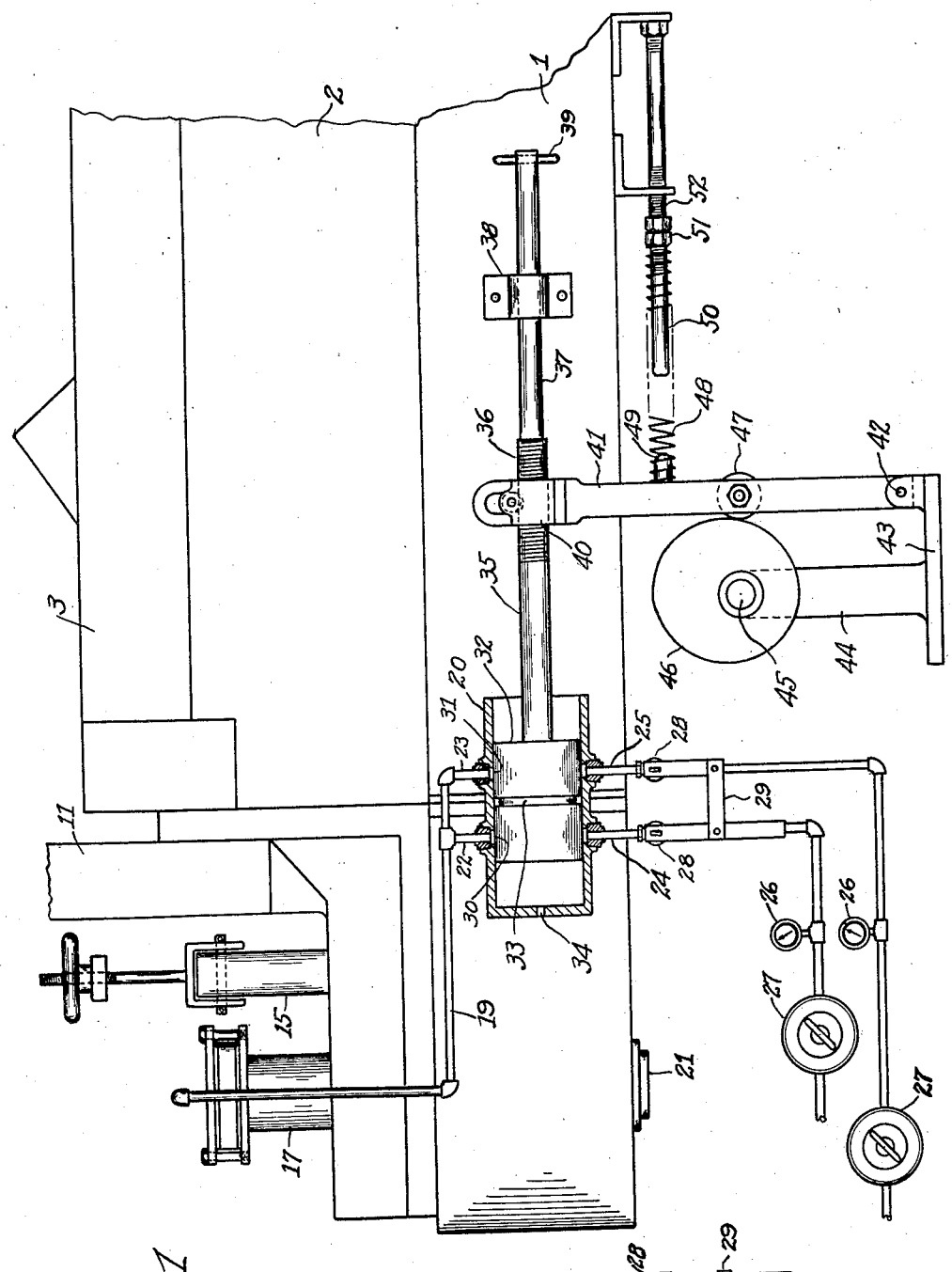
INVENTOR
George R. Haub
BY William B. Jaspert
ATTORNEY Sept. 8, 1936.                G. R. HAUB                2,053,663
                         GLASS FEEDING APPARATUS
                          Filed Feb. 25, 1932          4 Sheets-Sheet 2
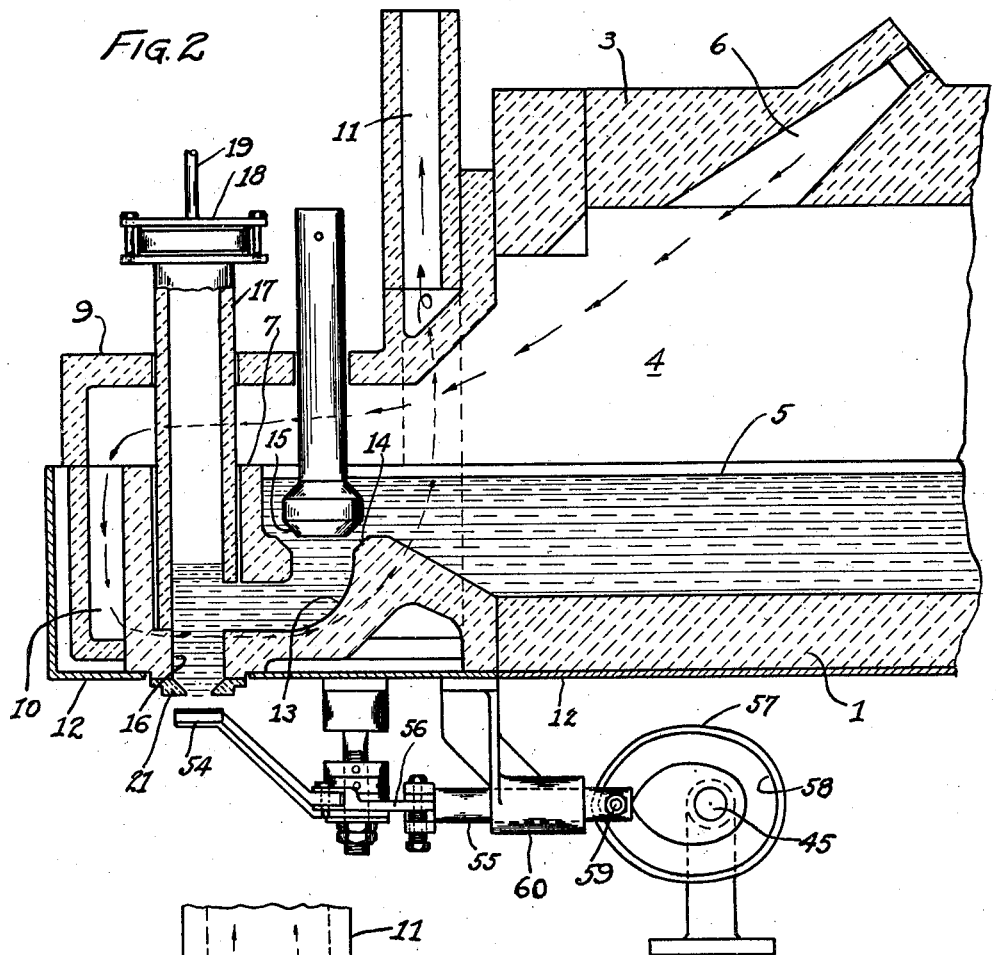

Sept. 8, 1936.  G. R. HAUB  2,053,663
GLASS FEEDING APPARATUS
Filed Feb. 25, 1932  4 Sheets-Sheet 3
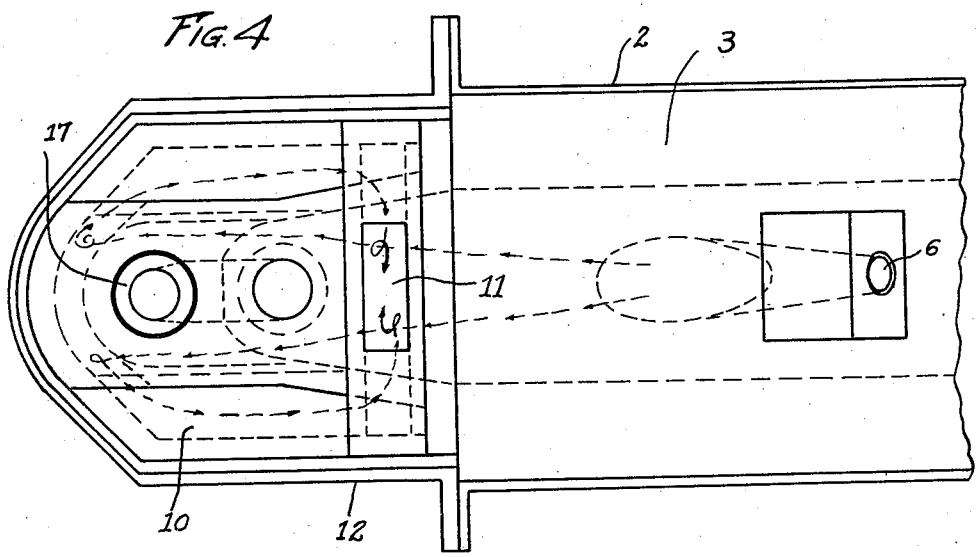
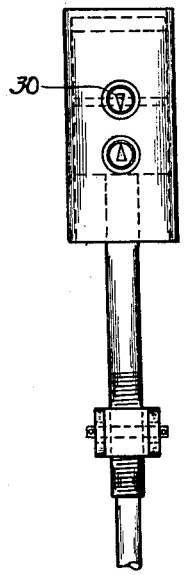
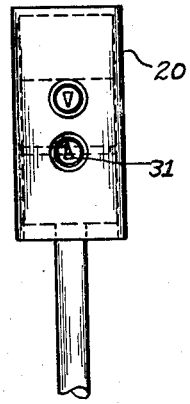
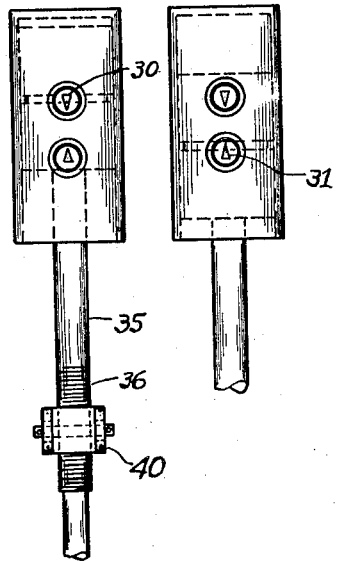
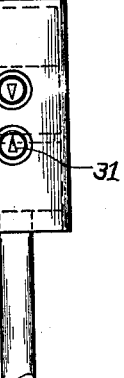
INVENTOR
George R. Haub
BY William B. Jaspert
ATTORNEY Sept. 8, 1936.  G. R. HAUB  2,053,663
GLASS FEEDING APPARATUS
Filed Feb. 25, 1932  4 Sheets-Sheet 4

INVENTOR
George R. Haub
BY William B. Jaspert
ATTORNEY

Patented Sept. 8, 1936

2,053,663

UNITED STATES PATENT OFFICE 2,053,663

GLASS FEEDING APPARATUS

George R. Haub, Crafton, Pa., assignor to Shawkee Manufacturing Company, Pittsburgh, Pa., a corporation of Pennsylvania Application February 25, 1932, Serial No. 595,101

2 Claims. (Cl. 49—55)

This invention relates to glass feeding apparatus more particularly to apparatus for producing gobs of glass and it is among the objects thereof to provide gob feeding apparatus of simple construction which shall be adapted to produce gobs of glass of uniform temperature.

Feeders of the conventional types draw the glass from the bottom at the end of the flow channel farthest remote from the heating source. The glass at the feeding or extrusion point being farthest from the source of heat and in contact with the colder refractory parts is not of uniform temperature and cold streaks run through the glass as it is discharged from the orifice. The cold streaks in the gobs produce uneven distribution of the glass in the walls of a blown article.

The present invention employs the upper strata of the glass in the flow channel for forming the gobs. The upper strata of glass is more uniform in temperature and is directed through a valved passage into a "well" directly above the discharge orifice. The refractory member containing the valved passage and well is surrounded by a heating zone to keep the glass at a uniform temperature just prior to its extrusion into gobs, and the waste gases from the combustion chamber are utilized in this heating zone. The glass is fed by impulse mechanism of the type disclosed in patent to Hitchcock #13,929 reissued June 15, 1915 and is of very simple construction. The weight of the gob of glass is controlled by a single adjustment requiring minimum skill and time on the part of the operator.

The device for imparting impulses to the surface of the glass comprises a cylinder forming an extension of the well which is provided with a closure at the top. Vacuum and pressure is communicated through a conduit at the top of the cylinder from a source of vacuum and pressure which is maintained at predetermined constant values and controlled by a movable valve. By applying the pressure and vacuum from a constant source the pressure regulating means incident to pump mechanism is eliminated and more positive control of gob shape and weight is obtainable.

Figure 10:
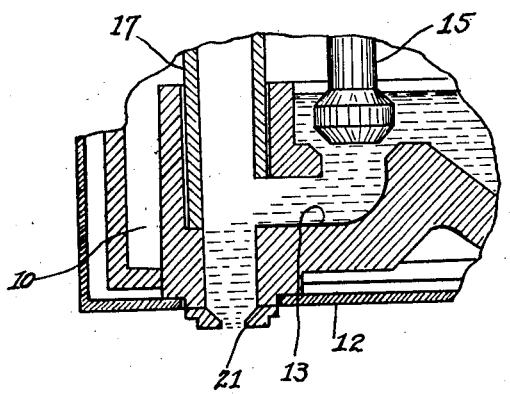

The apparatus and features of the invention will become more apparent from a consideration of the accompanying drawings constituting a part hereof, in which like reference characters designate like parts and in which:

Figure 1 is a side elevational view partially in section of glass feeding apparatus embodying the principles of this invention;

Figure 2 a longitudinal section of the feeder boot and flow channel wherein the functions of forming the gob of glass are confined;

Figure 3 a transverse section of the nose;

Figure 4 a top plan view of Fig. 1;

Figures 5 to 8 inclusive are bottom plan views respectively of the valve cylinder showing the valve in different positions relative to the cylinder ports; and, Figures 9 and 10 are detail views of the feeder boot illustrating different levels of glass in the well above the extrusion orifice.

With reference to the several figures of the drawings, the molten glass is fed from the refining end of a melting furnace (not shown) through a flow channel generally designated at 15 1. The channel has side walls 2 and a top cover 3 forming a heating chamber 4 wherein a glass pool 5 can be maintained at proper working temperature by a burner projected in a burner port 6. The burner port 6 is placed so that the flame is directed over the surface of the glass contained in a nose generally designated at 7 as shown by the direction of the arrows. The heat is confined in the chamber over the nose by side walls 8 and the top of an extension 9 of cover 3.

The wall 8 is spaced from the nose 7 to form an air space 10 through which the hot gases from the burner nozzle 6 are conducted, the heat passing downwardly as indicated by the arrows, and thence through side chambers 10, Figure 3, upwardly to a stack 11. By enveloping the nose with a heating chamber, the front and side walls of the nose are maintained at a temperature approximating that of the glass thereby preventing cold streaks in the glass which result from contact with the refractory material when it is cooler than the glass in the tank. A metallic liner 12 is disposed around the outer walls of the heating chamber to protect the refractory from damage.

The nose 7 is provided with an off-set channel 13 having a valved seat 14 which cooperates with a valve 15 to control the flow of the glass to the feeding orifice or extrusion points 16 below the well of the nose. A cylinder or tube 17 is disposed in the well of the nose and is provided with a sealed head 18 from which a conduit 19 extends to a cylinder 20 shown in Figure 1 of the drawings which communicates with a source of negative and positive pressure for a purpose to be hereinafter explained.

The quantity of glass flowing through the extrusion orifice 16 is controlled by the size of the orifice in the orifice ring 21. The amount of glass flowing through the channel 13 is controlled by valve 15 and the pressures exerted in the cylinder 17. The size of the orifice ring 21 is established by practice, the size depending upon the weight of the gob to be formed. The flow control valve 15 is operated in any suitable manner to subject it to vertical movement, and once the feeder has been regulated by means of the orifice ring and valve to produce a gob of desired size and form, any adjustment required to maintain the exact shape and weight of the gob is obtained through the pneumatic pressure regulating mechanism shown in Figure 1 of the drawings, which consists of the following devices.

With reference to Figures 1 and 2 of the drawings, the cylinder 17 is shown as disposed in the well of the nose 7 with its conduit 19 leading to a plurality of connections 22 and 23 of cylinder 20. Conduits 24 and 25 are connected to cylinder 20 in alinement with connections 22 and 23 and lead to a pressure and vacuum tank (not shown). Conduits 24 and 25 are provided with gauges 26 to designate the amount of positive or negative pressure and regulators 27 are provided to maintain the desired gauge pressure in the conduits.

Valves 28 are connected in conduits 24 and 25 and are jointly operated by a yoke 29 to disconnect cylinder 20 from the positive and negative pressure sources.

The cylinder 20 is provided with triangularly shaped ports 30 and 31 shown in Figures 5 to 8 inclusive of the drawings, and the ports are controlled by a slide valve 32 having an annular groove 33 in the center thereof. When groove 33 registers with the ports of one branch of conduit 19 and either of the conduits 24 or 25, pressure of conduit 24 or 25 is communicated to the cylinder 17 of the impulse mechanism.

Valve cylinder 20 is open at one end and is provided with an orifice 34 at its other end to prevent a back pressure in the cylinder. Valve 32 is actuated by a valve stem 35 which is provided with a screw threaded portion 36 terminating in a restricted portion 37 which is supported by a bearing bracket 38. The end of stem 35 is provided with a handle 39 whereby the valve stem may be rotated in its bearing 38 and in a screw nut 40 which cooperates with the threaded portion 36 of the stem.

Screw nut 40 constitutes the end of a lever 41 which is fulcrumed at 42 to a base 43, the base being provided with a pedestal bearing 44 that journals a cam shaft 45 on which a cam 46 is mounted for rotation with the shaft 45. Mounted on lever 41 is a roller or cam follower 47 which engages the peripheral face of cam 46 to actuate lever 41 in response to rotation of the cam. Lever 41 is normally biased against the face of cam 46 by a coil spring 48 which is disposed around a projection 49 secured to lever 41 at one end and around an adjusting rod 50 at its other end, the spring resting against a pair of adjusting nuts 51 that engage a screw thread 52 of the rod 50.

By rotating the screw nuts 51, the tension of spring 48 is varied in accordance with the degree of pressure it is desired to exert on lever 41 to effect contact with the actuating cam 46.

With reference to Figure 2 of the drawings, a cutting or shearing mechanism comprising a pair of shears 54 is disposed below the orifice ring 21, the shears being actuated by a plunger 55 to connected linkage 56. Plunger 55 is actuated by a cam 57 having a groove 58 in which a roller pivoted at 59 to plunger 55 is disposed. Plunger 55 is adapted for sliding movement in a bearing bracket 60 secured to the under side of the feeder boot.

Cam 57 is actuated by the cam shaft 45 that actuates cam 46 of the valve lever in Figure 1 of the drawings, and no adjustment is provided for varying the angular setting of cams 46 to 47 relative to each other to obtain what is commonly designated as phase-changing in this art.

The operation of the above described apparatus is briefly as follows:

Assuming that an orifice ring 21 of suitable size has been attached to the extrusion point below the air cylinder 17 and that valve 15 has been adjusted to control the flow of glass to the channel 13 to produce a proper size and weight of gob, the dual control lever 29 is then manipulated to the open position of the cocks 28 to establish communication of the pressure and vacuum source with the valve cylinder 20. Cam shaft 45 is actuated in any suitable manner as by connection with the ware forming machine. Movement of valve 32 will bring groove 33 alternately in alinement with ports 30 and 31 to connect cylinder 17 with the pressure and vacuum source through conduits 24 and 25. A predetermined pressure and vacuum will be maintained in the conduits 24 and 25 by regulators 27 during the operation of the feeder apparatus, although the pressure and vacuum at the source may be adjusted as another means of regulating the gob.

To effect changes in the weight of the gob, the pneumatic pressures are changed to vary the depth of glass in the well as shown in Figures 9 and 10 of the drawings. If, under normal working conditions, the depth of the glass is as shown in Figure 2 and it is desired to decrease the weight of the gob slightly, the air pressure is decreased and the vacuum is increased by adjusting valve stem 35 through its screw and nut mechanism 36 and 40 to reduce the opening of the triangular port 31 and increase opening of port 30 shown in Figures 7 and 8, to have the depth of the glass approach that shown in Figure 9 of the drawings. To increase the weight of the gob, variation of the pressure and vacuum is reversed, that is, the pressure is increased and the vacuum decreased with a resultant variation in the depth of the glass to that shown in the well in Figure 10 of the drawings. These pressures and vacuums must be related to each other, and the proper relationship is maintained by means of the adjustment of the valve 32 to vary the degree of opening of ports 30 and 31. In Figures 5 and 6 the openings of ports 30 and 31 are shown equal to apply full gauge pressures to cylinder 17.

On account of the relatively small openings of ports 30 and 31, the application of vacuum and pressure does not produce sudden surges or impulses as in some types of feeders nor are the impulses the entire motivating forces of the glass which forms the gobs.

For example, the initial application of vacuum to cylinder 17 retards the glass flow sufficiently sudden to constrict the gob for shearing. When the vacuum is cut-off the glass will flow by action of gravity through passage 13 to the well as controlled by valve 15. Upon application of pressure further flow through passage 13 is retarded and pressure is brought to bear on the glass above the orifice ring 21.

When pressure is cut-off for the final travel of the valve 32 the air in cylinder 17 will expand as it approaches the temperature of the glass, and will increase to several times its original volume which causes extrusion of the gob by displacement of the glass in the well of the cylinder.

Thus it is evident that the feeding pressure is by expansion of air in cylinder 17 and not caused by the original pressure of the pressure source although the feeding pressure will be in proportion to the source pressure.

The vacuum determines the height of the glass above the discharge orifice which in turn controls the weight of the gob.

It will be noted that the triangular ports 30 and 31 are disposed in such a manner that movement of the valve 32 in one direction will increase the size of opening in one of the ports and decrease the opening in the other. For example, by adjusting the valve stem 37 to move the valve 32 in an axial direction, the opening of the one port will be decreased and that of the other port increased and vice versa.

The shear 54 is operated by cam shaft 45 in synchronism with the application of alternately supplying pressures to the head of cylinder 17. Any adjustments made by the valve 32 effects all of the orifices simultaneously so that the shears work in conjunction with the expelling and retracting forces acting on the glass in the well of the cylinders.

By means of the above described mechanism, adjustment of the air pressure and vacuum for effecting change in the weight and size of gob is effected through a single means, namely, the rotation of the valve stem 35 by turning handle 39.

By utilizing the construction of the feeder channel with the burner and heating chamber disposed around the nose, the glass flowing to the extrusion point or in the well can be maintained at uniform temperature, since the refractory substance can be maintained at substantially the same temperature as the glass.

The feed channel 13 is so constructed that it receives the glass from the upper strata of the glass in the flow channel thereby preventing the ingress of the colder glass from the bottom of the channel to the well.

Although one embodiment of the invention has been herein illustrated and described, it will be obvious to those skilled in the art that various modifications may be made in the details of construction without departing from the principles herein set forth.

I claim:

1. Apparatus for feeding glass gobs of regulable weight and shape produced by impulses in an air cylinder, of cam operated means for varying said impulses, said means comprising a valve cylinder having connections with a source of pressure and vacuum and a cam operated valve disposed in said cylinder, said valve being adjustable to vary the size of the air and vacuum ports simultaneously to vary the impulses acting on the glass.

2. Apparatus for feeding glass gobs of regulable shape and weight including a valve mechanism for regulating the pressure and vacuum, said valve mechanism comprising a cylinder having triangularly shaped ports therein and having a valve with a circular passage adapted to cooperate with the ports, and means for adjusting said valve to vary the degree of opening of said ports, thereby varying the amount of pressure and vacuum of the feeding means.

GEORGE R. HAUB.